(12) United States Patent
Patti et al.

(10) Patent No.: US 8,991,527 B2
(45) Date of Patent: Mar. 31, 2015

(54) ROLLING MEANS OF A MOVING DEVICE AND RELATED MOVING DEVICE

(75) Inventors: Davide Giuseppe Patti, Mascalucia CT (IT); Daria Puccia, Catania CT (IT)

(73) Assignee: STMicroelectronics S.R.L., Agrate Brianza (MB) (IT)

(*) Notice: Subject to any disclaimer, the term of this patent is extended or adjusted under 35 U.S.C. 154(b) by 124 days.

(21) Appl. No.: 13/242,857

(22) Filed: Sep. 23, 2011

(65) Prior Publication Data

US 2012/0152628 A1   Jun. 21, 2012

(30) Foreign Application Priority Data

Dec. 21, 2010   (IT) .............................. VA2010A0096

(51) Int. Cl.
| | | |
|---|---|---|
| *B62D 57/00* | (2006.01) | |
| *B62D 61/00* | (2006.01) | |
| *B60B 19/00* | (2006.01) | |
| *B60K 7/00* | (2006.01) | |
| *H02K 41/00* | (2006.01) | |
| *H02K 41/03* | (2006.01) | |
| *B82Y 30/00* | (2011.01) | |
| *H02K 7/09* | (2006.01) | |
| *H02K 7/14* | (2006.01) | |

(52) U.S. Cl.
CPC ............... *B62D 57/00* (2013.01); *B62D 61/00* (2013.01); *B60B 19/003* (2013.01); *B60K 7/00* (2013.01); *B82Y 30/00* (2013.01); *H02K 7/09* (2013.01); *H02K 7/14* (2013.01); *H02K 41/031* (2013.01); *H02K 2201/15* (2013.01); *H02K 2201/18* (2013.01)
USPC .......................................................... 180/7.1

(58) Field of Classification Search
CPC ...... B62D 57/00; B62D 61/00; B60B 19/003; B60K 7/00; A61G 5/061; B62K 1/00; H02K 41/031
USPC ........................................ 180/7.1, 8.1, 8.2, 21
See application file for complete search history.

(56) References Cited

U.S. PATENT DOCUMENTS 6,140,045 A * 10/2000 Wohlstadter et al. ......... 435/6.11
6,737,160 B1 * 5/2004 Full et al. ...................... 428/397
(Continued)

FOREIGN PATENT DOCUMENTS

JP          60204252 A  * 10/1985   ............. H02K 41/03
JP       2007060891 A  *  3/2007   ............. H02K 57/00
(Continued)

OTHER PUBLICATIONS

Stefanini et al., "A Mobile Microrobot Driven by a New Type of Electromagnetic Micromotor", Seventh Intl Symposium on Micro Machine and Human Science, 1996, pp. 195-201.
(Continued)

*Primary Examiner* — Joseph Rocca
*Assistant Examiner* — Maurice Williams
(74) *Attorney, Agent, or Firm* — Allen, Dyer, Doppelt, Milbrath & Gilchrist, P.A.

(57) ABSTRACT

A moving device to move across a surface including a motor rolling motion apparatus is disclosed. The moving device is coupled to the motor and has a body with an outer surface. A dense population of fibrils protrudes from the outer surface, with each fibril having a free-end termination configured to establish adhesion to the surface by inter-molecular Van der Waals forces.

13 Claims, 4 Drawing Sheets

(56) References Cited

U.S. PATENT DOCUMENTS

| | | | |
|---|---|---|---|
| 6,872,439 B2* | 3/2005 | Fearing et al. | 428/99 |
| 7,011,723 B2* | 3/2006 | Full et al. | 156/60 |
| 7,344,617 B2 | 3/2008 | Dubrow | |
| 7,554,787 B2* | 6/2009 | Pelrine et al. | 361/234 |
| 7,762,362 B2* | 7/2010 | Cutkosky et al. | 180/8.5 |
| 7,891,445 B1* | 2/2011 | McKinley et al. | 180/7.1 |
| 8,111,500 B2* | 2/2012 | Pelrine et al. | 361/234 |
| 8,414,792 B2* | 4/2013 | Rouse | 252/75 |
| 2007/0082197 A1* | 4/2007 | Ko et al. | 428/367 |
| 2007/0289786 A1* | 12/2007 | Cutkosky et al. | 180/8.6 |
| 2008/0179115 A1* | 7/2008 | Ohm et al. | 180/9.21 |
| 2008/0257615 A1* | 10/2008 | Xie et al. | 180/8.7 |
| 2010/0059298 A1* | 3/2010 | Pelrine et al. | 180/9 |
| 2010/0258362 A1* | 10/2010 | Trimmer | 180/7.1 |
| 2011/0204281 A1* | 8/2011 | Rouse | 252/75 |
| 2011/0311427 A1* | 12/2011 | Hauge et al. | 423/325 |
| 2011/0316173 A1 | 12/2011 | Patti et al. | |
| 2012/0149824 A1* | 6/2012 | Hocke et al. | 524/496 |

FOREIGN PATENT DOCUMENTS

| | | | | |
|---|---|---|---|---|
| JP | 2009296864 A | * | 12/2009 | H02K 57/00 |
| WO | 2006083282 | | 8/2006 | |

OTHER PUBLICATIONS

"Nanotube Adhesive Sticks Better Than a Gecko's Foot", Science Daily, http://www.sciencedaily.com/releases/2007/06/070619083554.htm, Jun. 2007, pp. 1-2.

* cited by examiner

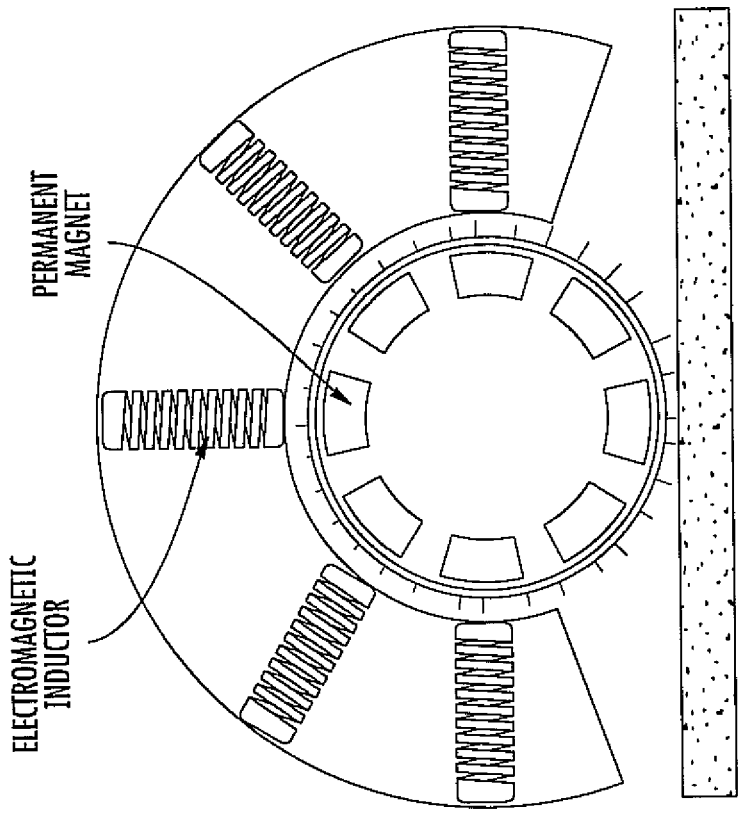
FIG. 2
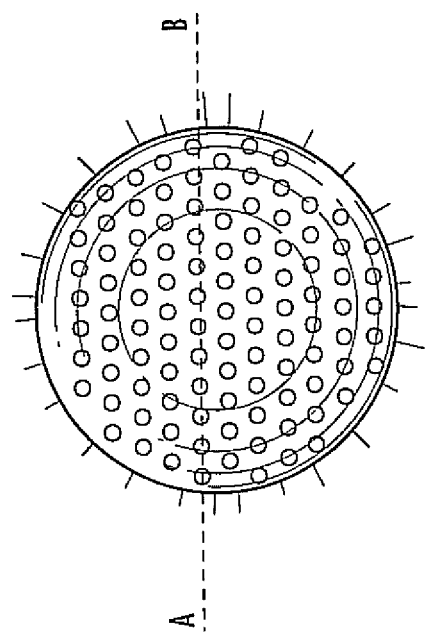

ROLLING MEANS OF A MOVING DEVICE AND RELATED MOVING DEVICE

FIELD OF THE INVENTION

This invention relates, in general, to a moving device and, more particularly, to a rolling apparatus equipped with a dense population of fibrils adapted to adhere to a rolling surface by means of Van der Waals adhesion forces and a related moving device.

BACKGROUND OF THE INVENTION

Motion of microscopic and macroscopic moving devices, in particular over highly steep or even vertical surfaces or even in absence of gravity, is widely studied in robotics. These extreme situations require moving devices capable to adhere to the rolling surface, so as to prevent them from slipping thereon or detaching therefrom in case of vertical surfaces, while at the same time preventing them from remaining stuck on the surface.

Magnetic adhesion apparatuses could be realized if the surface on which the moving device should move is metallic, though they would be completely useless in devices adapted to move on surfaces of a different kind. In nature it has been noticed that geckos are capable of climbing walls made of any kind of material. This extraordinary ability is explained in physics with the intermolecular forces of Van der Waals generated between the end terminations of geckos hair and generic surfaces. In particular, each square millimeter of the skin of the fleshy parts of the fingertips of geckos have thousands of keratin bristles (setae). Each bristle has a diameter of about half a micrometer and fringes at the tip in hundreds of branches (spatula), each of which has a size in the order of a nanometer. The adhesion onto the surfaces is thus due to intermolecular Van der Waals forces, that is very weak electrostatic attraction forces distributed among molecules and that, multiplied by the very large contact surface due to the extreme density and ramification of the setae, determine a great adhesion force.

When geckos want to stick to a surface, they flatten the fleshy parts of the fingertips such to obtain the maximum contact surface of the setae. For moving, before lifting a leg, geckos incline their fingers to modify the angle of the spatulae with respect to the bearing plane. In so doing, the contact surface between the setae and the bearing plane decrease until a "critical level" is attained, below which adhesion forces abruptly drop.

Researches carried out on geckos have been published in the article "Nanotubes Adhesive Sticks Better Than A Gecko's Foot", ScienceDaily, Jun. 20, 2007, wherein the scientists of the Rensselaer Polytechnic Institute and of the University of Akron affirm that they realized a very strong adhesive ribbon made of carbon nanotubes, that uses the typical adhesion forces of geckos setae. The authors of this article sustain that the ribbon may be attached and detached on a great variety of materials, including Teflon™, that the ribbon has adhesion characteristics up to ten times larger than those of geckos, and that the ribbon is capable of generating anisotropic cohesion forces, i.e. that vary depending on the considered direction. In particular, the generated adhesion force ranges from 10 N (the force naturally present between geckos fingers and walls) up to 100 N. The function of nanotubes is essentially to increase the contact surface.

The detachment is made possible because the setae are realized on a flexible substrate, thus it is possible to forcibly modify the inclination of setae to nullify the Van der Waals forces between setae and adhesion surfaces.

Even if in this article the use of the adhesive layer is proposed for realizing feet of robots capable of climbing vertical walls, nothing is said about how and with which power dissipation a robot could move if its feet adhere to the wall with an adhesion force sufficient to withstand at least its weight.

SUMMARY OF THE INVENTION

The realizing of a moving device capable of climbing vertical surfaces of different nature, or even of moving while being upside down without excessive power consumption, has now been accomplished.

This invention is thus directed to a moving device capable of climbing vertical walls of any nature and even of moving while being upside down.

The applicant has verified that the phenomena that allow geckos to adhere on and even to move upon any surface may be reproduced in objects macroscopically definable as rigid, provided that there are rolling apparatuses such as wheels, spheres, cylinders or even track chains, fabricated such to be covered with a dense population of nanometric fibrils. A fabrication method of surfaces covered with fibrils of nanometric diameter or thickness is disclosed in the Italian patent application No. TO2010A000555, herein incorporated by reference, in the name of the same applicant.

A moving device equipped with a motor functionally coupled to these rolling apparatuses is thus capable of climbing a wall without slipping or detaching therefrom. According to a preferred embodiment, this dense population comprises also fibrils inclined by a first angle in respect to a radial or normal direction to the surface of the rigid rolling/moving body and fibrils inclined by an angle opposite to the first.

These rolling apparatuses may for example, comprise the rotor of a brushless motor.

BRIEF DESCRIPTION OF THE DRAWINGS

FIG. 2 shows a brushless motor with a sphere equipped with a dense population of fibrils.

DETAILED DESCRIPTION OF THE PREFERRED EMBODIMENTS

Studies carried out by the applicant have shown that rolling apparatuses, such as wheels or spheres, or even track chains, equipped with a dense population of fibrils, may allow the motion of a motor device even on vertical walls, without excessive power consumption and without having to design complicate means for favoring detachment of fibrils from the surface on which they adhere, even if the rolling means is rigid.

Figure 1:
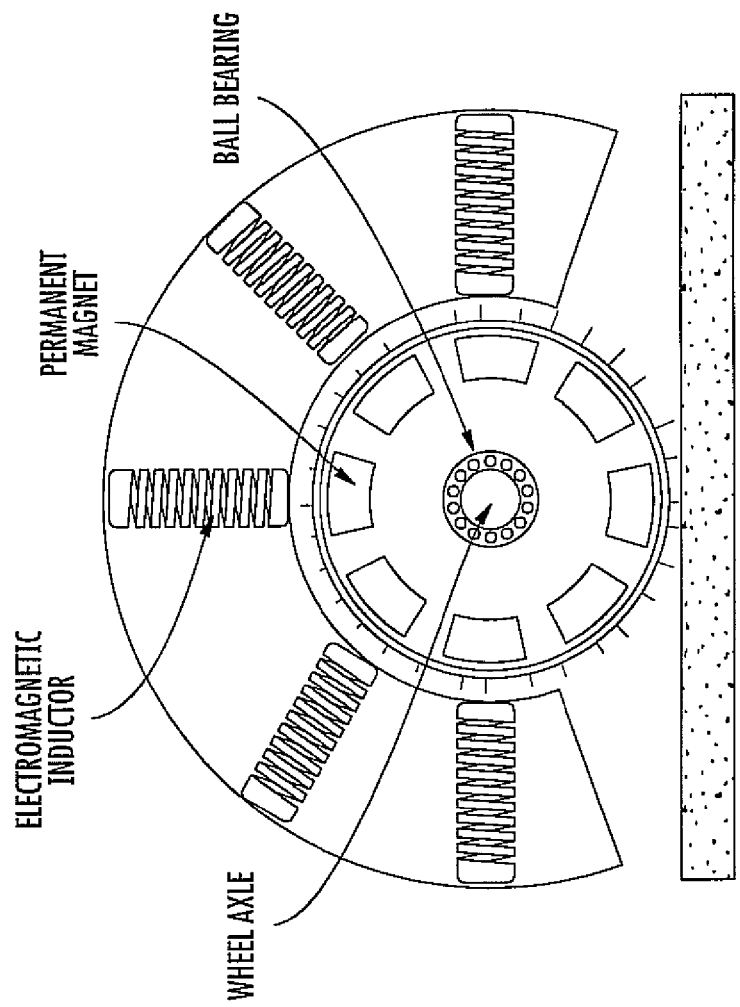
FIG. 1 shows a brushless motor with a wheel equipped with a dense population of fibrils.
Figure 1:
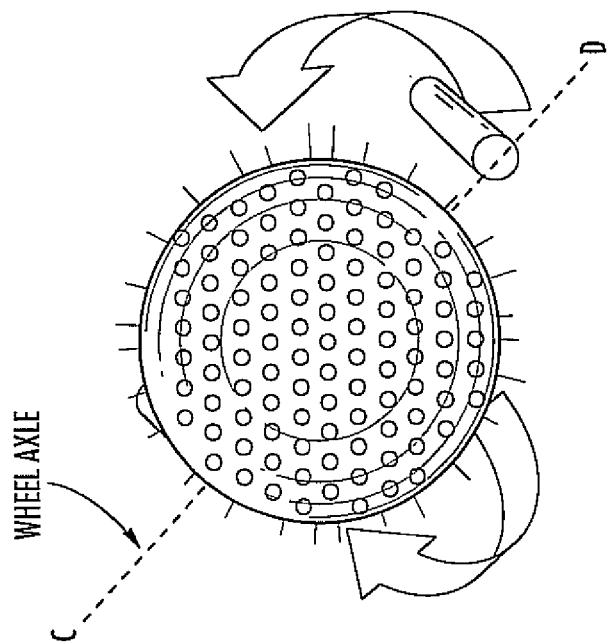

FIGS. 1 and 2 show respectively a brushless motor with a wheel and a brushless motor with a sphere of a moving device the rolling apparatus of which (the wheel or the sphere, respectively) is rigid and covered by fibrils. As an alternative, not shown in the figures, it would also be possible to realize a chained moving device, the track chains having a dense population of fibrils.

The contact fibrils between the rolling means and the rolling surface ensure a Van der Waals adhesion force sufficient to allow the moving means to climb even vertical walls. The detachment of fibrils, without which there would be no rolling at all, is ensured by the motor, that forces the rolling means to go further. The fibrils in contact with the rolling surface, in the opposite direction to the motion direction, are inclined elastically until they detach themselves, and the fibrils that are in the motion direction go in contact with the surface and adhere thereto, firmly keeping the moving device to the wall. The fibrils in contact with the rolling surface in the opposite direction in respect to the moving direction are to be detached, and this may be done without excessive power losses.

Figure 3:
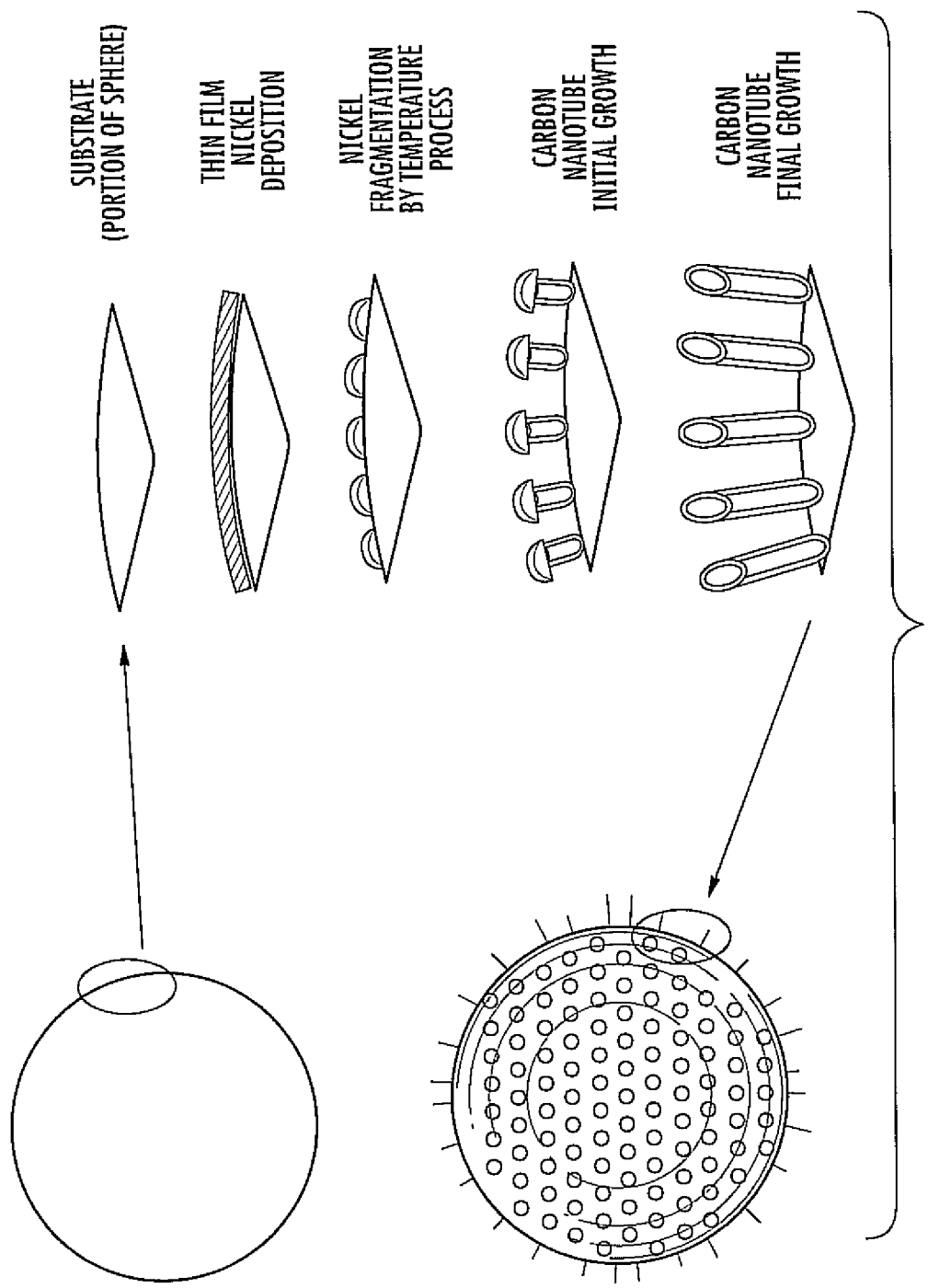
FIG. 3 schematically illustrates how to realize carbon nanotubes on a sphere of non ferromagnetic material.

According to an embodiment, the fibrils may be made of carbon nanotubes, fabricated on the rolling apparatus with the process depicted in FIG. 3 and more diffusely described in the Italian patent application TO2010A000555. A method that may be used includes depositing a nickel layer, and heating it up such to transform it into drops onto which nanotubes grow. A dense population of nanotubes with the head made of nickel drops is obtained, and the sphere will be covered by nanotubes. The distance therebetween is nanometric and their length may attain about 10 nm. The permanent magnets inside the wheel or sphere are highlighted and in the covering of the depicted mouse there are electromagnetic inductors, such to magnetically couple magnets and coils between them.

In the embodiment of FIG. 1 the sphere of the brushless motor is tied to the stator through a shaft. By installing in the device of FIG. 1 also the means for modifying the rotation axis, the device is allowed to move in any direction.

Figure 4:
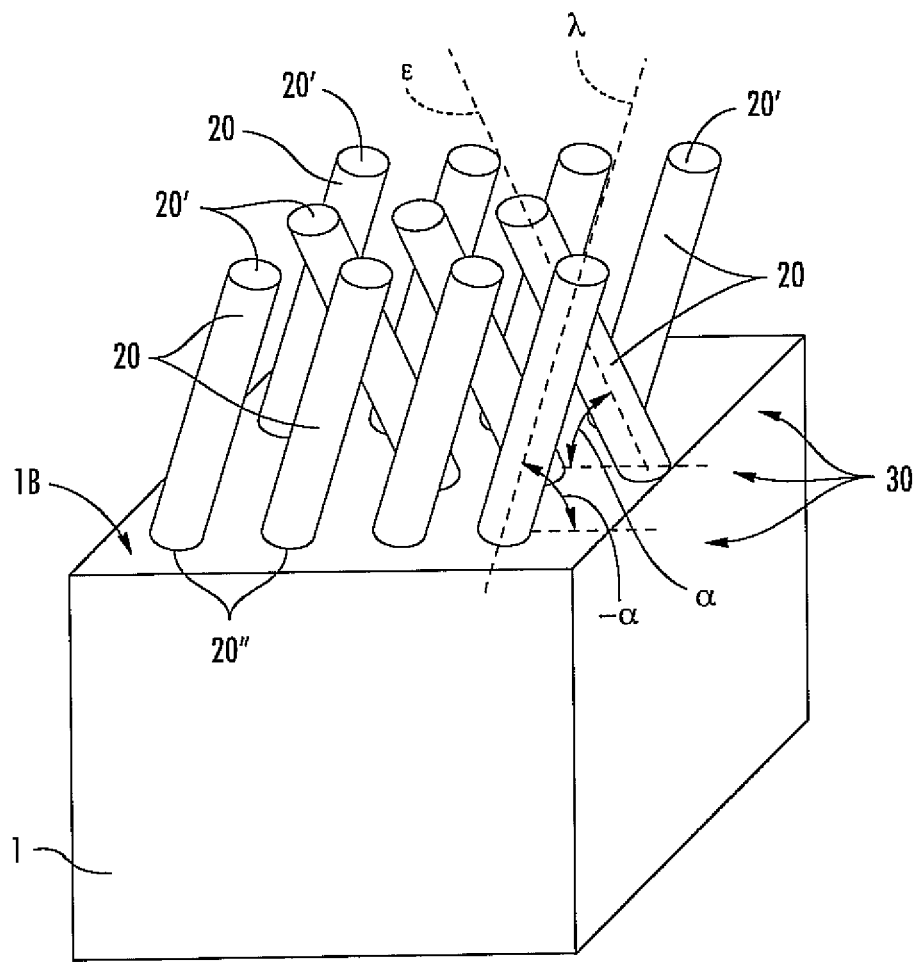
FIG. 4 shows fibrils having opposite inclination realized on rolling apparatuses.

According to another embodiment, the population of fibrils of the rolling apparatus comprises fibrils realized such to be inclined by an angle in respect to a radial direction, and fibrils inclined by the opposite angle, as shown in FIG. 4. This ensures an adhesion of the fibrils to the rolling surface even firmer than the substantially radial fibrils shown in FIGS. from 1 to 3.

The rolling apparatus, for example a wheel or sphere or cylinder or track chain, may be of any type of material, for example rubber, plastic, etc. but ferromagnetic material. This invention may be used in the field of motion of macroscopic objects, for example robots of macroscopic size, such as a ball of a mouse or of a moving lamp capable of climbing walls. It may also be used in case of microscopic objects such as a tablet-chip that may move inside the human body for exploring it for diagnostic or therapeutic purposes. Another possible application relates to rechargeable microbatteries with solar light that move towards the recharging source guided by an optical sensor. This invention makes easy the motion of these objects and does not need any complex robotic device or purposely dedicated microcontroller.

That which is claimed is:

1. A moving device to roll across a surface and comprising:
   a stator comprising a stator body and a plurality of electromagnets carried thereby;
   a rotor rotatably mounted within said stator and comprising a rotor body and a plurality of permanent magnets carried thereby; and
   a plurality of carbon nanotube fibrils protruding from an outer surface of said rotor body and having free-ends configured to establish adhesion to the surface by intermolecular Van der Waals forces;
   said plurality of permanent magnets cooperating with said plurality of electromagnets to define a brushless motor so that supplying electrical power to said stator causes rotation of said rotor to thereby roll the moving device across the surface while said plurality of carbon nanotube fibrils establishes adhesion to the surface;
   wherein said plurality of carbon nanotube fibrils comprise alternating rows of carbon nanotube fibrils inclined at opposing, intersecting angles from orthogonal to the outer surface of the rotor.

2. The moving device of claim 1, wherein said rotor is rotatably mounted within said stator with a gap therebetween.

3. The moving device of claim 1, wherein said plurality of carbon nanotube fibrils have diameters of between 1nm and 5 nm, and lengths of between 1 μm and 5 μm.

4. The moving device of claim 1, wherein an orientation of said plurality of carbon nanotube fibrils is elastically modifiable during rolling.

5. The moving device of claim 1, wherein said plurality of carbon nanotube fibrils is configured to elastically deflect by an angle of between 0° and 30° from orthogonal to the outer surface of said rotor.

6. The moving device of claim 1, wherein said rotor body has a cylindrical shape.

7. The moving device of claim 1, wherein said rotor body has a spherical shape.

8. A moving device to roll across a surface and comprising:
   a stator comprising a stator body and a plurality of electromagnets carried thereby;
   a rotor rotatably mounted within said stator with a gap therebetween, said rotor comprising a rotor body and a plurality of permanent magnets carried thereby; and
   a plurality of carbon nanotube fibrils protruding from an outer surface of said rotor body and having free-ends configured to establish adhesion to the surface by intermolecular Van der Waals forces;
   said plurality of permanent magnets cooperating with said plurality of electromagnets to define a brushless motor so that supplying electrical power to said stator causes rotation of said rotor to thereby roll the moving device across the surface while said plurality of carbon nanotube fibrils establishes adhesion to the surface;
   said plurality of carbon nanotube fibrils comprising alternating rows of carbon nanotube fibrils inclined at opposing, intersecting angles from orthogonal to the outer surface of said rotor.

9. The moving device of claim 8, wherein said plurality of carbon nanotube fibrils have diameters of between 1 nm and 5 nm, and lengths of between 1 μm and 5 μm.

10. The moving device of claim 8, wherein an orientation of said plurality of carbon nanotube fibrils is elastically modifiable during rolling.

11. The moving device of claim 8, wherein said plurality of carbon nanotube fibrils is configured to elastically deflect by an angle of between 0° and 30° from orthogonal to the outer surface of said rotor.

12. The moving device of claim 8, wherein said rotor body has a cylindrical shape.

13. The moving device of claim 8, wherein said rotor body has a spherical shape.

* * * * *